(12) United States Patent
Sekiya et al.

(10) Patent No.: US 10,604,189 B2
(45) Date of Patent: Mar. 31, 2020

(54) VEHICLE BODY FRONT PART STRUCTURE

(71) Applicant: HONDA MOTOR CO., LTD., Tokyo (JP)

(72) Inventors: Takayuki Sekiya, Wako (JP); Akira Haga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 158 days.

(21) Appl. No.: 16/016,902

(22) Filed: Jun. 25, 2018

(65) Prior Publication Data

US 2018/0370572 A1 Dec. 27, 2018

(30) Foreign Application Priority Data

Jun. 27, 2017 (JP) ................................. 2017-125263

(51) Int. Cl.
| | |
|---|---|
| *B60J 7/00* | (2006.01) |
| *B62D 21/15* | (2006.01) |
| *B62D 27/00* | (2006.01) |
| *B62D 25/08* | (2006.01) |
| *B62D 27/02* | (2006.01) |

(52) U.S. Cl.
CPC ......... *B62D 21/155* (2013.01); *B62D 21/152* (2013.01); *B62D 25/08* (2013.01); *B62D 25/085* (2013.01); *B62D 27/00* (2013.01); *B62D 27/02* (2013.01)

(58) Field of Classification Search
CPC ....... A63H 17/26; B60F 1/005; B60G 17/019; B60G 2300/26; B60G 5/047; B60K 23/0808; B60T 8/1755; B60T 8/266; B60T 8/4872; B62D 7/159

USPC ..................................................... 296/187.09
See application file for complete search history.

(56) References Cited

U.S. PATENT DOCUMENTS

| | | | |
|---|---|---|---|
| 9,027,695 B2 * | 5/2015 | Nakamura ........... | B62D 21/155 180/247 |
| 9,067,549 B2 * | 6/2015 | Baccouche .......... | B62D 21/152 |
| 9,211,915 B2 * | 12/2015 | Abe ..................... | B62D 21/152 |
| 9,421,927 B2 * | 8/2016 | Basappa ................ | B60R 19/26 |

(Continued)

FOREIGN PATENT DOCUMENTS

| | | |
|---|---|---|
| DE | 102009014822 A1 | 10/2010 |
| JP | 2012-214211 A | 11/2012 |

(Continued)

OTHER PUBLICATIONS

Japanese Office Action dated Dec. 11, 2018 with English translation, 14 pages.

*Primary Examiner* — Kiran B Patel
(74) *Attorney, Agent, or Firm* — Rankin, Hill & Clark LLP

(57) ABSTRACT

Included are a pair of left and right front side frames extending in a vehicle front-rear direction, and each including an inner side frame on an inner side and an outer side frame on an outer side; and a gusset member arranged on a vehicle width direction outer side of a vehicle front-side end portion of each front side frame, and including an inclination portion which inclines such that, in its plan view, becomes closer to the front side frame toward a vehicle rear. A vehicle front-side end portion of the outer side frame includes a width widening portion which becomes wider outward in a vehicle width direction. The gusset member includes a fixation portion which is vertically fixed to the width widening portion.

5 Claims, 10 Drawing Sheets

(56) References Cited

U.S. PATENT DOCUMENTS

| | | | |
|---|---|---|---|
| 9,555,756 B2* | 1/2017 | Sugano | B60R 19/04 |
| 9,925,937 B2* | 3/2018 | Watanabe | B60R 19/24 |
| 2012/0248820 A1 | 10/2012 | Yasui et al. | |
| 2013/0241233 A1* | 9/2013 | Ohnaka | B62D 21/152 |
| | | | 296/187.1 |
| 2013/0320709 A1* | 12/2013 | Kuwabara | B62D 21/152 |
| | | | 296/187.09 |
| 2014/0062129 A1* | 3/2014 | Syed | B60R 19/24 |
| | | | 296/187.1 |
| 2015/0014084 A1 | 1/2015 | Iwama et al. | |
| 2016/0280272 A1* | 9/2016 | Haga | B62D 27/023 |
| 2016/0347374 A1 | 12/2016 | Miyamoto et al. | |
| 2017/0113726 A1* | 4/2017 | Matsushima | B62D 21/152 |
| 2017/0113727 A1* | 4/2017 | Nakamoto | B60R 19/34 |
| 2017/0113735 A1* | 4/2017 | Kawabe | B62D 25/08 |
| 2017/0151919 A1 | 6/2017 | Kashiwagi et al. | |
| 2017/0217501 A1* | 8/2017 | Takeda | B62D 21/152 |
| 2018/0370571 A1* | 12/2018 | Sekiya | B62D 21/152 |
| 2019/0023324 A1* | 1/2019 | Sekiya | B60K 1/04 |
| 2019/0185061 A1* | 6/2019 | Haga | B62D 21/155 |
| 2019/0185062 A1* | 6/2019 | Kato | B62D 21/157 |

FOREIGN PATENT DOCUMENTS

| | | |
|---|---|---|
| JP | 2015-016727 A | 1/2015 |
| JP | 5953887 B2 | 7/2016 |
| JP | 2017-088127 A | 5/2017 |
| JP | 2017-100555 A | 6/2017 |
| WO | 2015122276 A1 | 8/2015 |

* cited by examiner

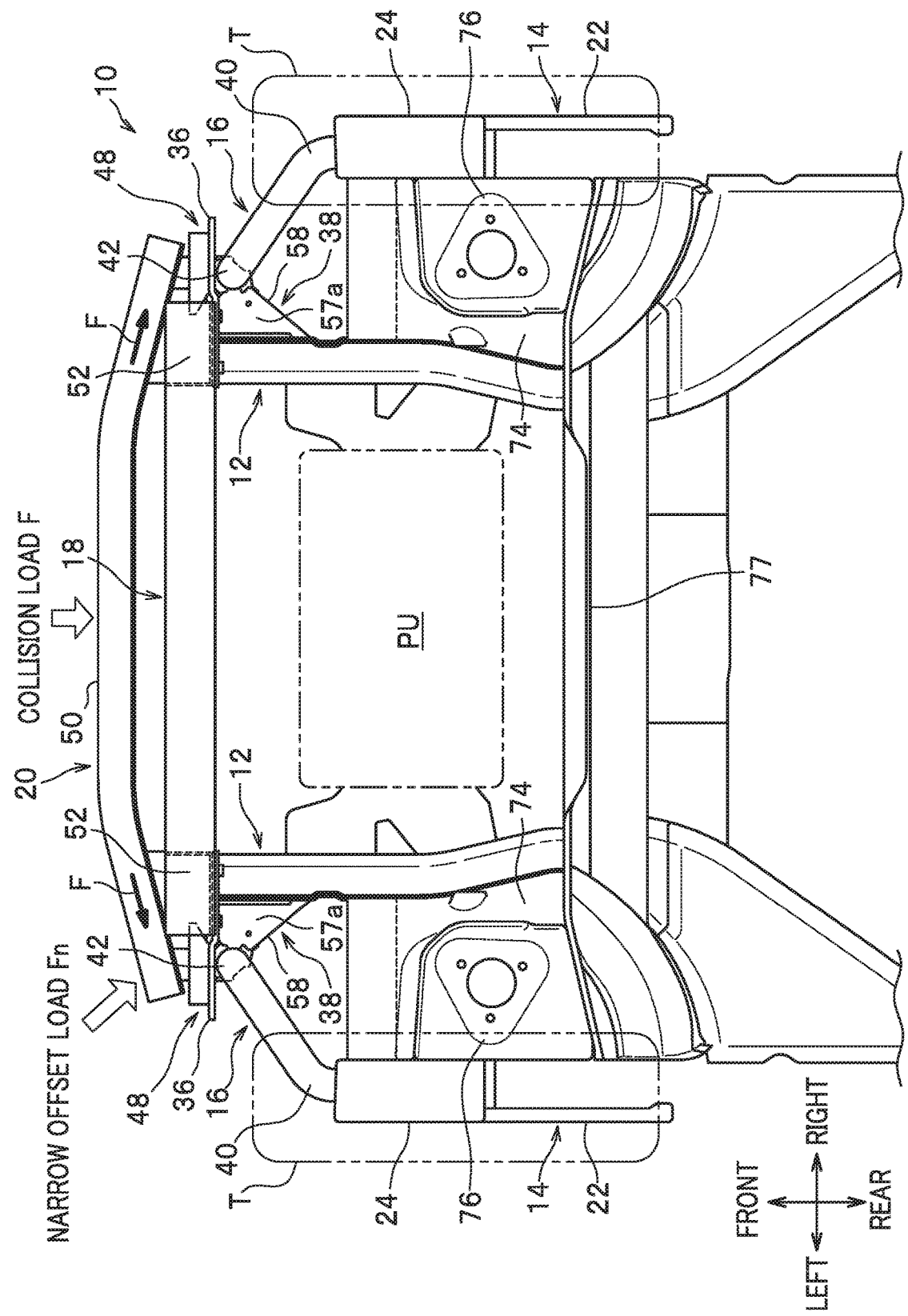

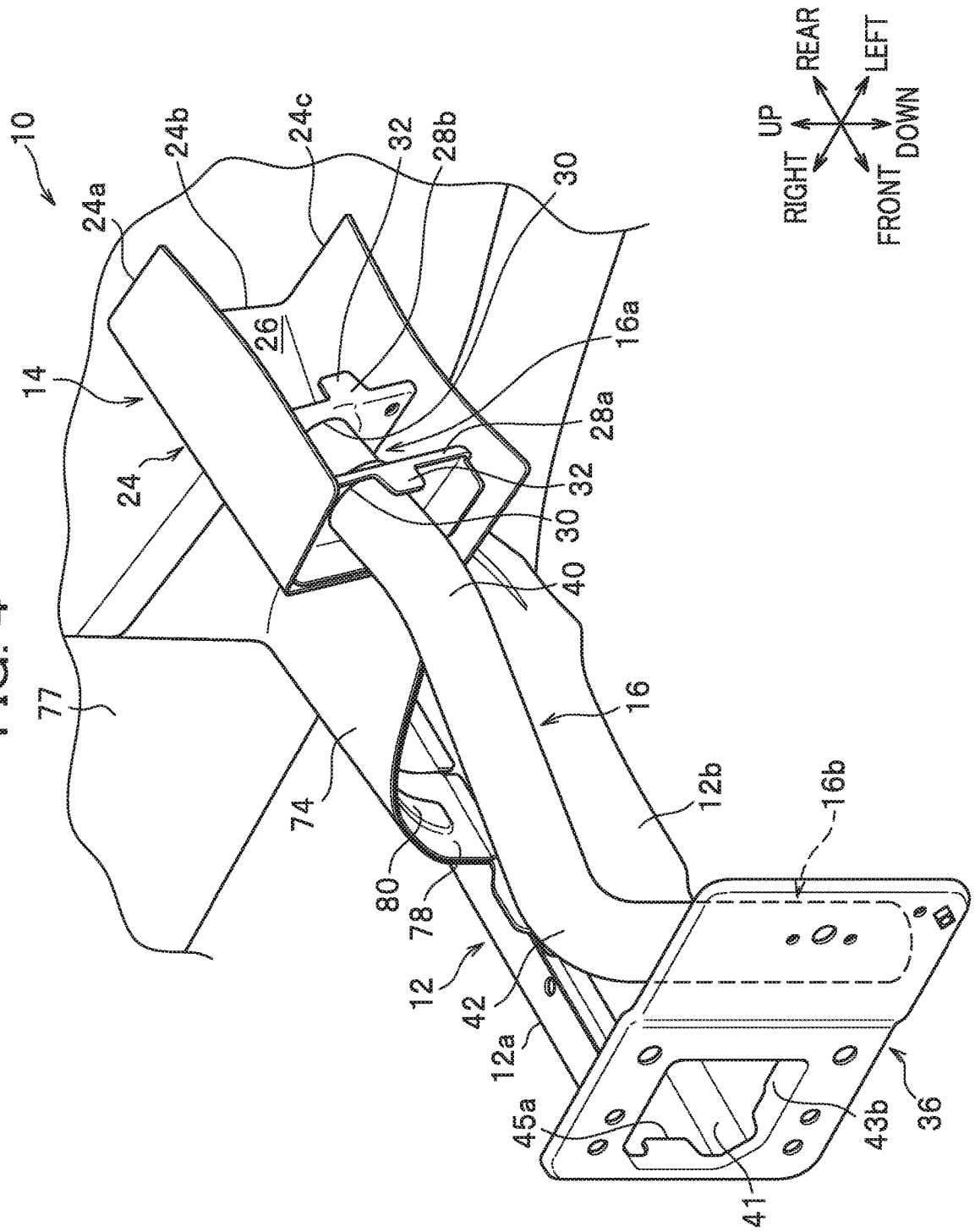

VEHICLE BODY FRONT PART STRUCTURE

BACKGROUND OF THE INVENTION

1. Field of the Invention

The present invention relates to, for example, a vehicle body front part structure for a vehicle such as an automobile.

2. Description of the Related Art

Japanese Patent No. 5953887, for example, discloses a vehicle body front part structure in which a gusset (first projecting portion) is fixed to an upper flange portion and a lower flange portion of each of a pair of left and right front side frames.

This gusset is arranged in a location further rearward than each of a pair of left and right crash cans configured to absorb collision load which is inputted from a bumper beam.

SUMMARY OF THE INVENTION

In the vehicle body front part structure disclosed in Japanese Patent No. 5953887, however, each gusset is fixed to the corresponding front side frame in a way that the gusset extends outward in a vehicle width direction (or fixed to an outer side of the front side frame, and oriented in a horizontal direction).

For this reason, there is likelihood that collision load transmitted to the upper and the lower flange portions of the front side frame separates the gusset from the front side flame, for example, when the collision load is inputted into the vehicle body front part structure from a vehicle front.

The present invention has been made to solve the above problems, and an object thereof is to provide a vehicle body front part structure which is capable of inhibiting separation of a gusset member from a front side frame when collision load is inputted into the vehicle body front part structure from a vehicle front.

For the purpose of solving the above problems, the present invention is a vehicle body front part structure which is characterized in that the vehicle body front part structure includes: a pair of left and right front side frames extending in a vehicle front-rear direction, and each including an inner member on an inner side and an outer member on an outer side; and a gusset member arranged on a vehicle width direction outer side of a vehicle front-side end portion of each front side frame, and including an inclination portion which inclines such that, in its plan view, becomes closer to the front side frame toward a vehicle rear. The vehicle body front part is also characterized in that: a vehicle front-side end portion of the outer member includes a width widening portion which becomes wider outward in the vehicle width direction; and the gusset member includes a fixation portion which is vertically fixed to the width widening portion.

According to the present invention, it is possible to obtain the vehicle body front part structure which is capable of inhibiting the separation of the gusset member from the front side frame when collision load is inputted into the vehicle body front part structure from the vehicle front.

BRIEF DESCRIPTION OF THE DRAWINGS

FIG. 2 is a plan view of the vehicle body front part shown in FIG. 1.

FIG. 4 is a schematic perspective view showing a left lower member, the left front side frame and the like.

FIG. 5 is a side view showing the left lower member, the left front side frame and the like.

DETAILED DESCRIPTION OF THE EMBODIMENTS

Embodiments of the present invention will be hereinafter described in detail with reference to the accompanying drawings depending on the necessity.

It should be noted that in each drawing, "front and rear" indicates a vehicle front-rear direction; "left and right" indicates a vehicle width direction (left-right) direction; and "up and down" indicates a vertical up-down direction.

A vehicle using a vehicle body front part structure according to an embodiment of the present invention includes a vehicle body made from a monocoque body. The left and right halves of the vehicle body are arranged left-right symmetrically with respect to a center line (not illustrated) passing through the center of the vehicle in the vehicle width direction and extending in the vehicle front-read direction.

Figure 1:
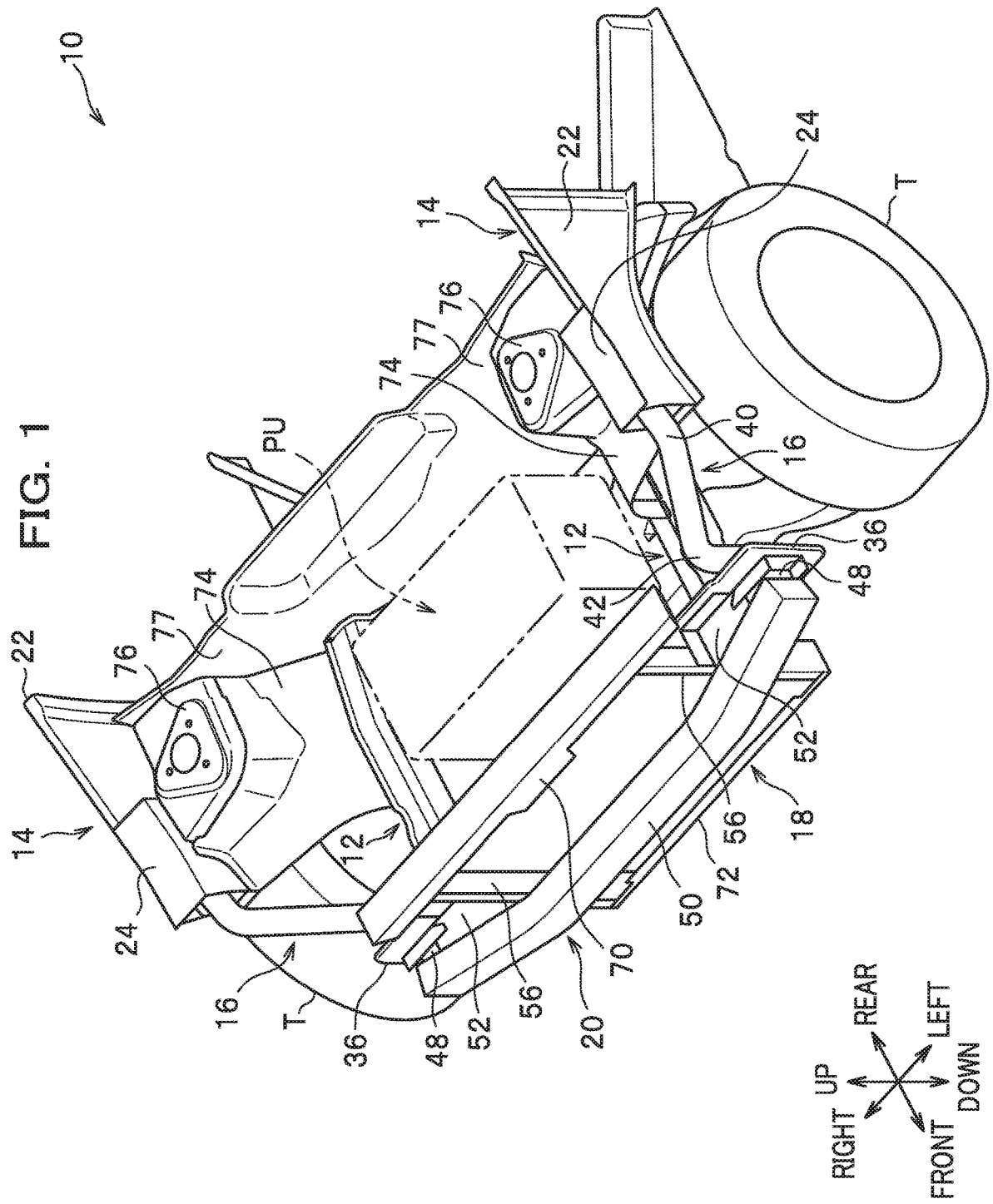
FIG. 1 is a schematic perspective view showing a vehicle body front part of a vehicle using a vehicle body front part structure according to an embodiment of the present invention.

As shown FIG. 1 and FIG. 2, a vehicle body front part 10 includes a pair of left and right front side frames 12, 12, a pair of left and right upper members 14, 14, a pair of left and right lower members 16, 16, a front bulkhead 18, and a front bumper mechanism 20.

As shown in FIG. 1, the pair of left and right front side frames 12, 12 are respectively arranged on the vehicle width direction left and right sides of the vehicle body front part 10, and extend in the vehicle front-rear direction. A vehicle rear-side end portion of each front side frames 12 is connected to a cross member (not illustrated). Incidentally, in FIG. 1, reference sign "PU" denote a power unit which integrally includes, for example, a motor and an engine as rotational drive sources, as well as a transmission and others.

Figure 3A:
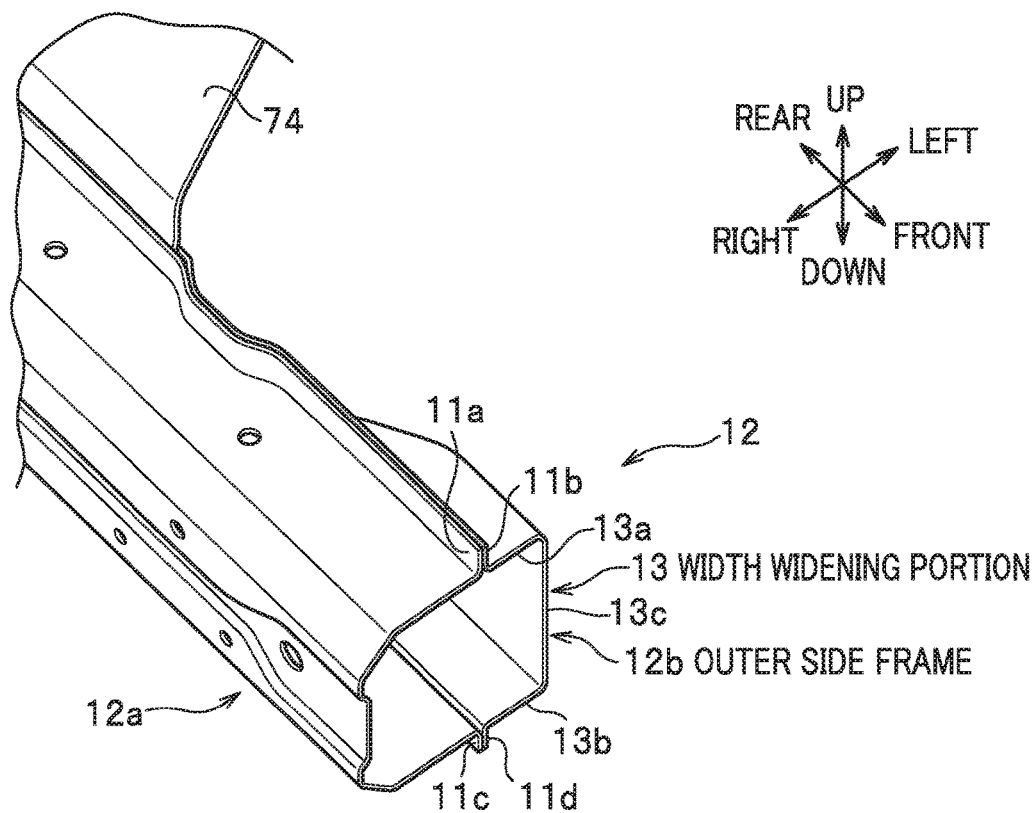
FIG. 3A is a perspective view showing a vehicle front-side end portion of a left front side frame illustrated in FIG. 1.
Figure 3B:
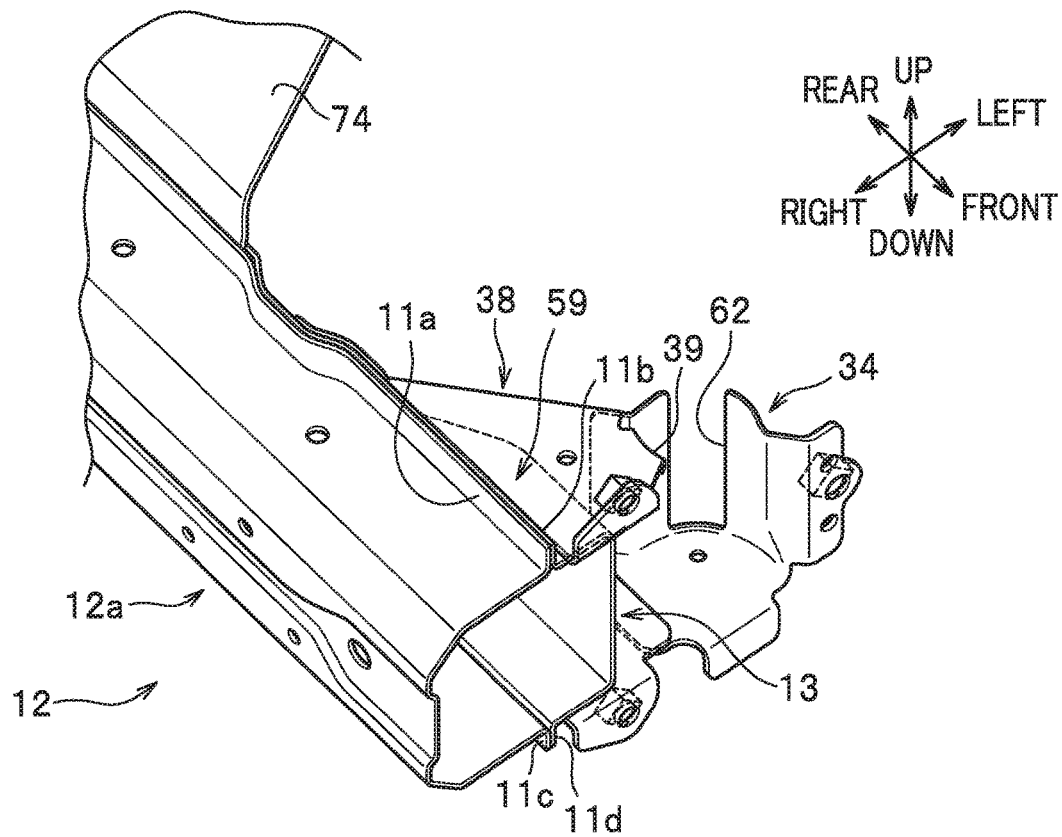
FIG. 3B is a perspective view showing how a gusset and a mounting bracket are attached to a vehicle width direction outside portion of the left front side frame illustrated in FIG. 3A.

As shown in FIGS. 3A and 3B, each front side frame 12 includes an inner side frame (inner member) 12a and an outer side frame (outer member) 12b. An upper flange 11a of the inner side frame 12a and an upper flange 11b of the outer side frame 12b are integrally joined together, while a lower flange 11c of the inner side frame 12a and a lower flange 11d of the outer side frame 12b are integrally joined together. Each front side frame 12 is made of a hollow member whose cross section is shaped like a rectangle, and has a space portion 12c with a closed cross section in its inside (see FIG. 5).

The inner side frame 12a is arranged on the vehicle width direction inner side, and is formed in the shape of a hat. The outer side frame 12b is arranged on the vehicle width direction outer side, and is formed substantially in the shape of a flat plate except for a width widening portion 13, which will be discussed later.

As shown in FIG. 3A, a vehicle front-side end portion of the outer side frame 12b is provided with the width widening portion 13 which becomes wider outward in the vehicle width direction toward its front end. The width widening portion 13 has a cross section which is shaped like a hat, unlike the rest of the outer side frame 12b which is shaped like a flat plate.

Figure 9:
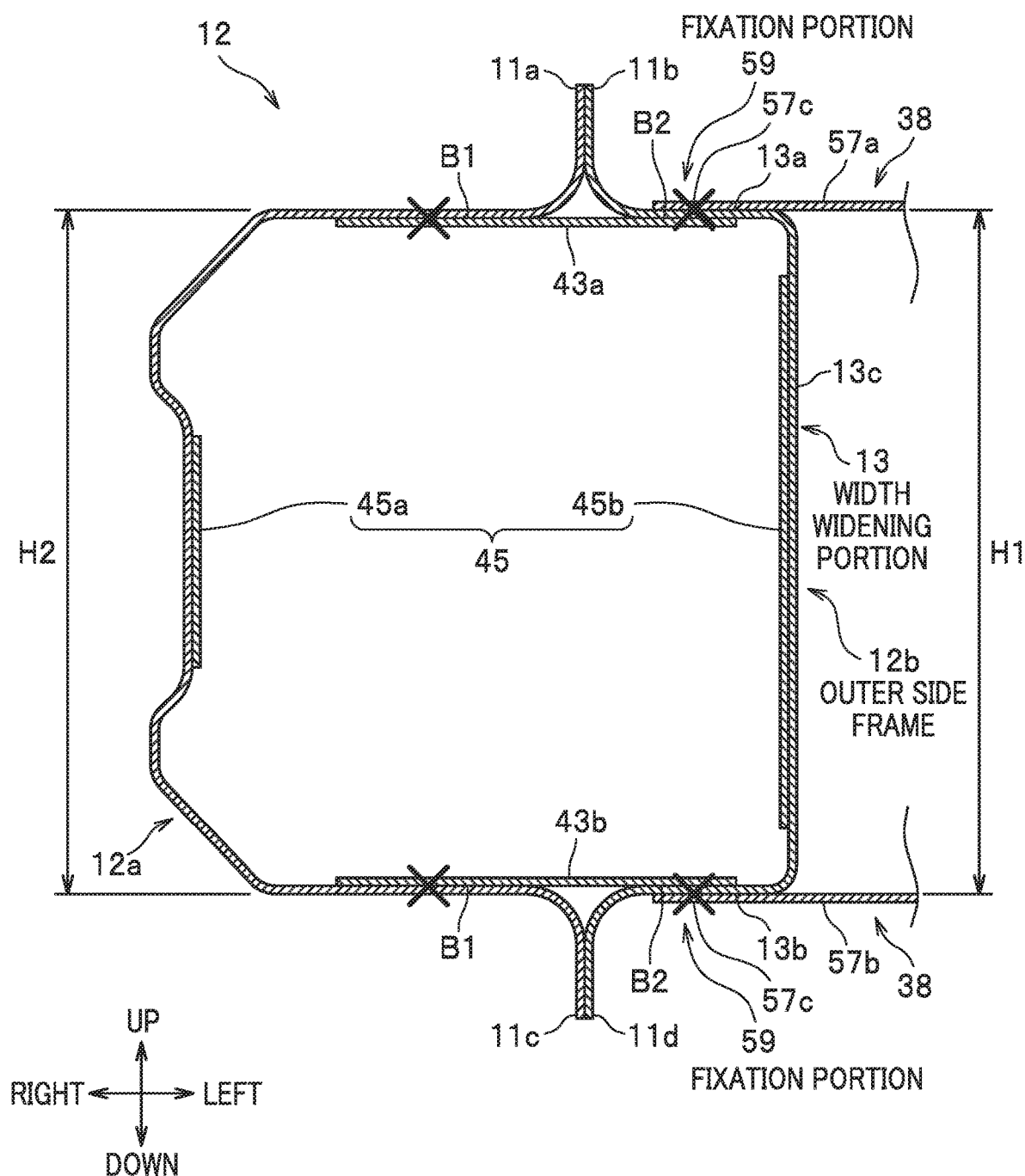
FIG. 9 is an end view taken along the IX-IX line of FIG. 6.

As shown in FIG. 3A and FIG. 9, the width widening portion 13 includes: an upper wall 13a; a lower wall 13b; a vertical wall 13c connecting the upper wall 13a and the lower wall 13b; an upper flange 11b continuing from the upper wall 13a; and a lower flange 11d continuing from the lower wall 13b. As shown in FIG. 9, a vertical height dimension H1 of the width widening portion 13 is equal to a vertical height dimension H2 of the inner side frame 12a (H1=H2).

As shown in FIG. 2, the pair of left and right upper members 14, 14 are arranged outward of the pair of left and right front side frames 12, 12 in the vehicle width direction, and extend in the vehicle front-rear direction. Vehicle rear-side end portions of the upper members 14, 14 are connected to a pair of left and right front pillars (not illustrated), respectively. Tires T, components of left and right front wheels, are arranged under the upper members 14, 14, respectively.

As shown in FIG. 4, each upper member 14 includes an upper member main body 22, and an upper inner member 24 attached to the upper member main body 22. The upper member main body 22 is made of a member extending in the vehicle front-rear direction, and shaped like a flat plate. In its side view, the upper member main body 22 is formed to become wider in the vertical direction toward the vehicle rear from the vehicle front.

The upper inner member 24 is arranged in a location which is further forward than the upper member main body 22 in the vehicle front direction and further inward than the upper member main body 22 in the vehicle width direction. The upper inner member 24 has a cross section which is shaped substantially like the letter U. The upper inner member 24 includes an upper wall 24a, a side wall 24b and a lower wall 24c (see FIG. 4). The upper wall 24a and the lower wall 24c are arranged facing each other across the side wall 24b which is located in between, and are joined respectively to the vehicle front-side upper and lower end portions of the upper member main body 22.

As shown in FIG. 4, a space portion 26 is formed by the inner surface of the upper inner member 24 and the outer surface of the upper member main body 22. A pair of bulkhead mounting metal brackets 28a, 28b configured to fix a vehicle rear-side end portion 16a of the lower member 16 are arranged in the space portion 26 with a predetermined space in between. Each bulkhead mounting metal bracket 28a (28b) includes: a circular retaining hole 30 configured to retain the vehicle rear-side end portion 16a of the lower member 16; and a flange 32 jointed to the inner surface of the upper inner member 24 and the outer surface of the upper member main body 22.

Figure 5:
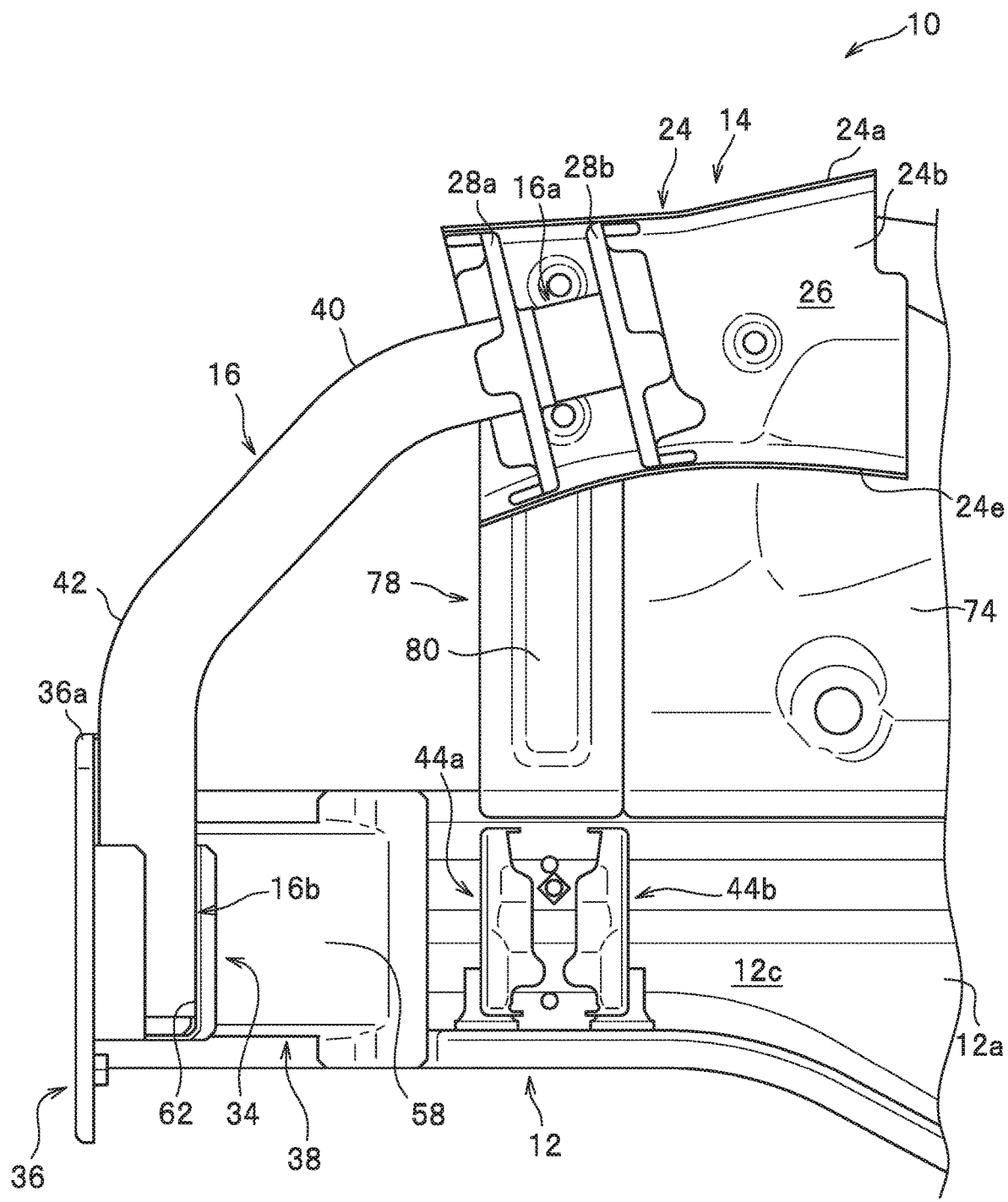

Each lower member 16 includes a first bending portion 40 and a second bending portion 42. As shown in FIG. 2 and FIG. 5, the first bending portion 40 is formed to bend downward, and inward in the vehicle width direction, from the vehicle rear-side end portion 16a which is fixed to the corresponding upper member 14. As shown in FIG. 4, the second bending portion 42 is formed to be located further forward than the first bending portion 40 in the vehicle front direction, and to bend downward.

A part of each lower member 16 from the vehicle rear-side end portion 16a to the first bending portion 40 is formed substantially in a straight line shape. A part of each lower member 16 from a vehicle front-side end portion 16b to the second bending portion 42 is formed substantially in a straight line shape. In each lower member 16, the vehicle front-side end portion 16b located lower than the second bending portion 42 extends in a straight line shape in the vertical direction. The second bending portion 42 is located higher than an upper end 36a of a connecting plate 36 (see FIG. 4).

Each lower member 16 is located further forward than the corresponding upper member 14 in the vehicle front direction, and is formed from a hollow pipe member. The vehicle front-side end portion 16b of lower member 16 is supported at three points with the assistance of a mounting bracket 34 and a gusset 38, which will be described later.

Figure 6:
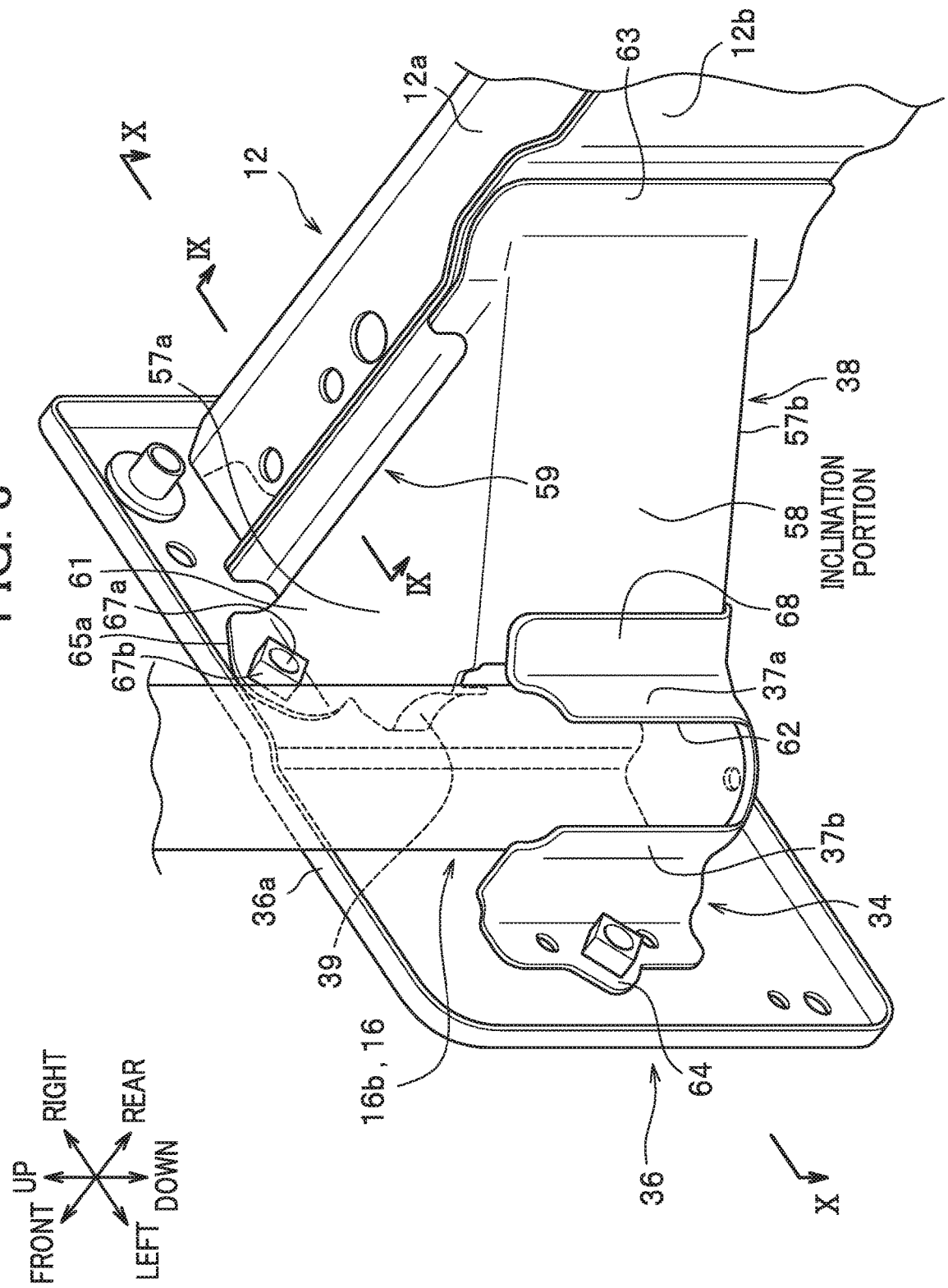
FIG. 6 is a perspective view showing how a vehicle front-side end portion of the left lower member is supported.
Figure 10:
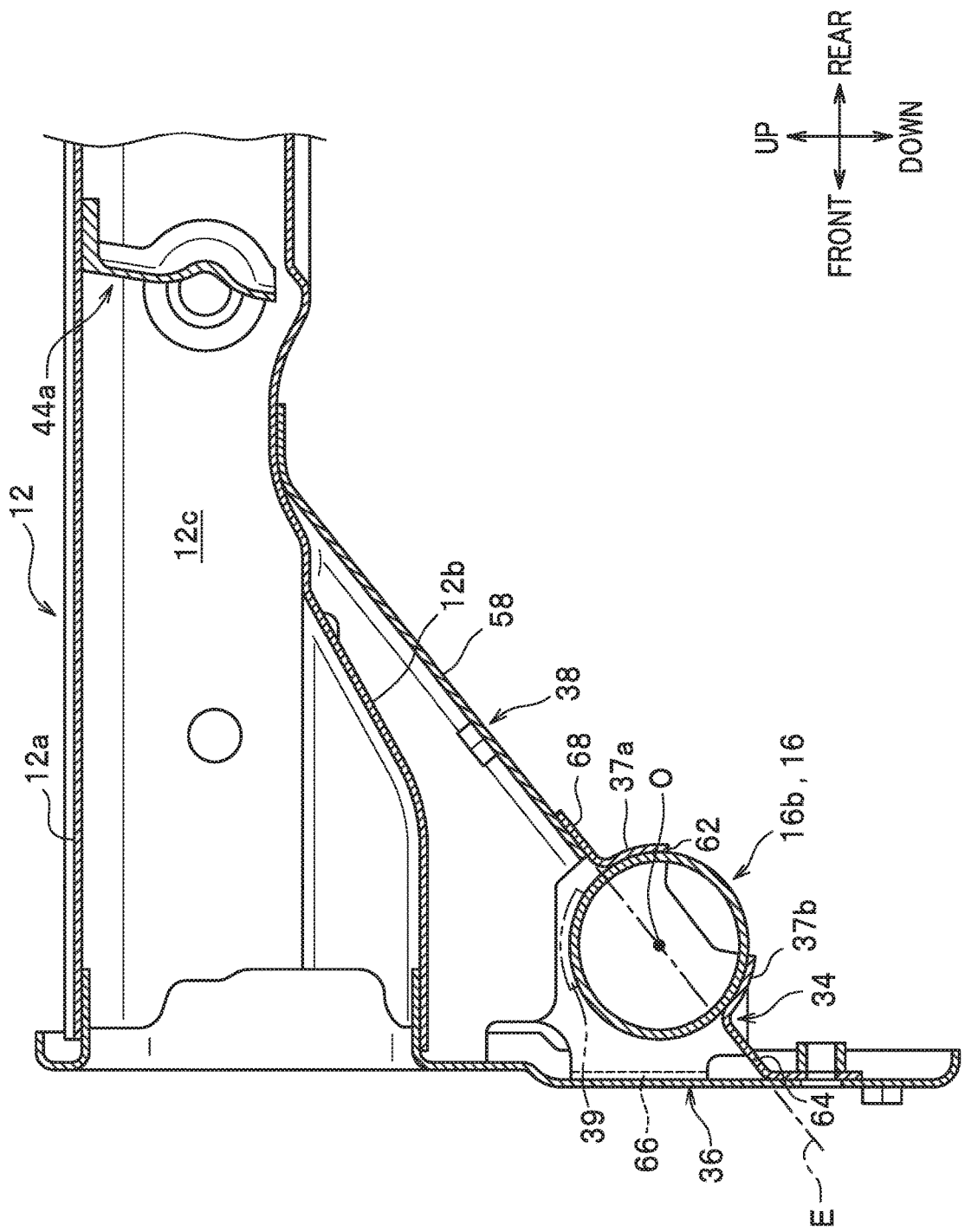
FIG. 10 is an end view taken along the X-X line of FIG. 6.

To put it specifically, as shown in FIG. 10 and FIG. 6, the vehicle front-side end portion 16b of lower member 16 is supported at three points by a set of support wall 37a, 37b provide to the mounting bracket 34, and a support portion 39 provided to the gusset 38. The set of support wall 37a, 37b are arranged across a slit 62 formed in the mounting bracket 34. The support wall 37a, 37b are formed to stand upright from a bottom surface portion of the mounting bracket 34, and to surround a part of the outer circumferential surface of the vehicle front-side end portion 16b. The support portion 39 is arranged on a vehicle width direction outer side of an upper end portion of the gusset 38.

As discussed above, the vehicle rear-side end portion 16a of the lower member 16 is connected to front parts of the upper member 14 (the upper member main body 22 and the upper inner member 24) with the assistance of the pair of bulkhead mounting metal brackets 28a, 28b (see FIG. 5).

As shown in FIG. 5, in a vehicle front-side end portion of each front side frame 12, a pair of bulkhead metal brackets 44a, 44b are disposed in a part of the space portion 12c which is near the gusset 38. The pair of bulkhead metal brackets 44a, 44b are arranged in the vehicle front-rear direction with a predetermined space in between. The pair of bulkhead metal brackets 44a, 44b are jointed to the inner wall of the inner side frame 12a with the assistance of a flange.

The pair of bulkhead mounting metal brackets 28a, 28b provided to the space portion 26 of the upper member 14 and the pair of bulkhead metal brackets 44a, 44b provided to the space portion 12c of the front side frame 12 are arranged in a location where the pair of bulkhead mounting metal brackets 28a, 28b are vertically above the pair of bulkhead metal brackets 44a, 44b.

As shown in FIG. 6, the connecting plate (connecting member) 36, the gusset (gusset member) 38 and the mounting bracket 34 are placed on the vehicle front-side end portion of each front side frame 12 and on the vehicle width direction outer side of the vehicle front-side end portion of thereof.

In its plan view, the connecting plate 36 is shaped substantially like a rectangle. In the plan view, a rectangular opening 41 is formed in a location offset inward in the vehicle width direction from the center of the connecting plate 36. A flange portion is provided to the four sides of the opening 41. The flange portion is bent, and extends from a vehicle rear-side surface of the connecting plate 36 toward the inside of the vehicle front-side end portion of the front side frame 12 (see FIG. 4).

Figure 8:
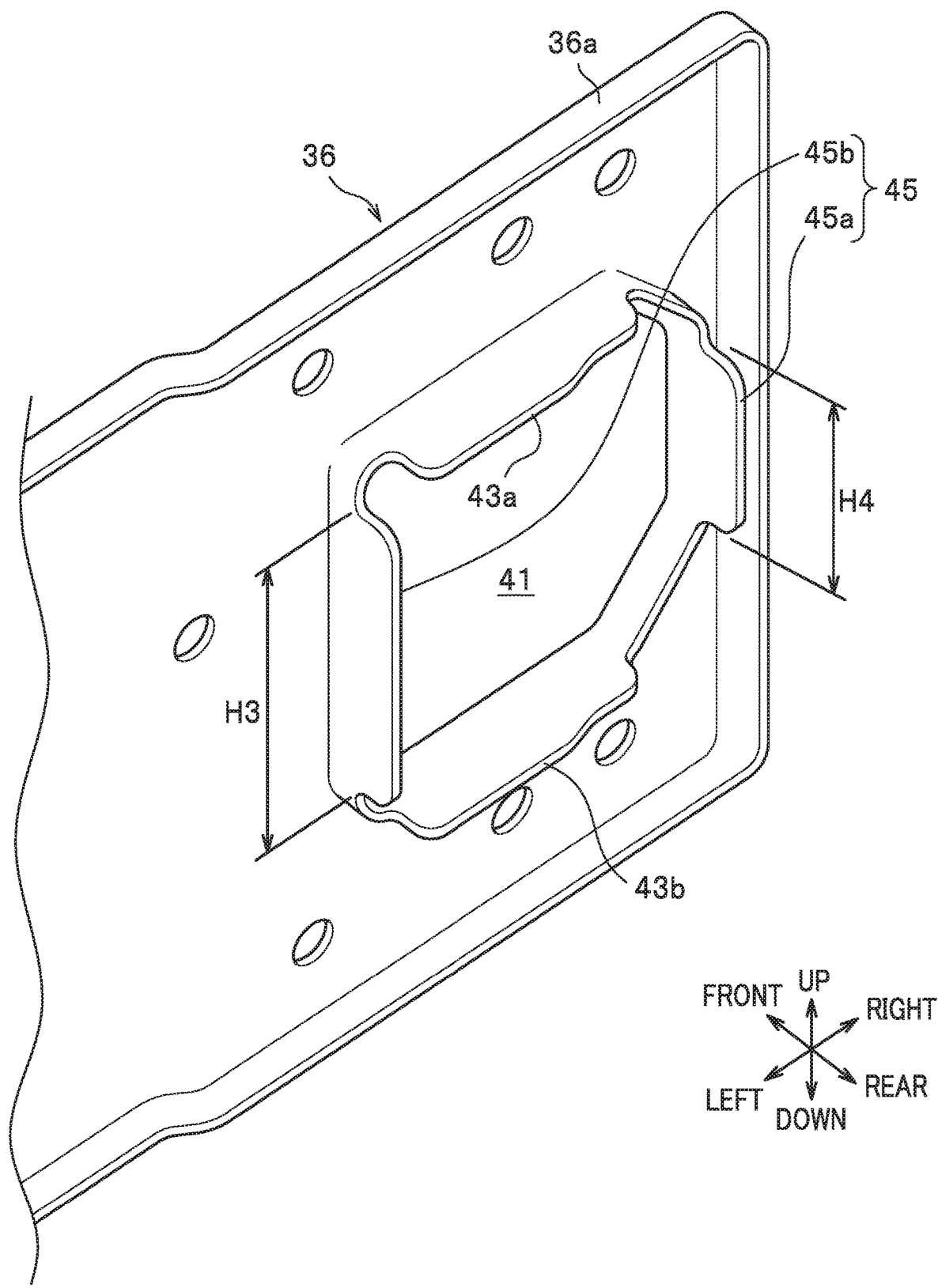
FIG. 8 is a partially-omitted perspective view showing a connecting plate as seen from a vehicle rear side (from a back side).

As shown in FIG. 8 and FIG. 9, the flange portion includes an upper flange portion 43a and a lower flange portion 43b which are vertically arranged facing each other with the opening 41 in between. The upper and lower flange portions 43a, 43b fix (join) the connecting plate 36 to both the inner side frame 12a and the outer side flame 12b vertically. In other words, the upper and lower flange portions 43a, 43b are joined to the vehicle front-side end portion of the front side frame 12, using two sets of upper and lower joining surfaces (B1+B2) which include both upper and lower joining surfaces B1 corresponding to the inner side frame 12a and upper and lower joining surfaces B2 corresponding to the outer side frame 12b (the width widening portion 13) (see FIG. 9).

As shown in FIG. 8 and FIG. 9, the flange portion further includes a set of vehicle width direction flange portions 45 which are arranged on the two vehicle width direction sides of the opening 41. The set of vehicle width direction flange portions 45 includes a vehicle width direction inner-side flange portion 45a and a vehicle width direction outer-side flange portion 45b. The vehicle width direction inner-side flange portion 45a is joined to the inner side of a side wall of the inner side frame 12a. The vehicle width direction outer-side flange portion 45b is joined to the inner side of the vertical wall 13c of the width widening portion 13. A vertical height dimension H3 of the vehicle width direction outer-side flange portion 45b is longer than a vertical height dimension H4 of the vehicle width direction inner-side flange portion 45a (H3>H4).

As shown in FIG. 1 and FIG. 2, each connecting plate 36 extends outward from the front end portion of the vehicle in the vehicle width direction which is substantially orthogonal to an axial direction of the corresponding front side frame 12. A bumper beam 50 of the front bumper mechanism 20, which will be described later, is connected to the vehicle width direction outer side of the vehicle front-side surface of each connecting plate 36 with the assistance of a corresponding extension 48 of the front bumper mechanism 20. In addition, a connector 52 is joined to the vehicle width direction inner side of the vehicle front-side surface of the connecting plate 36. The connector 52 is connected to a corresponding side stay 56 of the front bulkhead 18.

In its vertical cross-sectional view, each gusset 38 is formed in the shape of the letter U. The gusset 38 includes: an upper wall 57a and a lower wall 57b which are substantially triangular in their plan view; an inclination portion 58; a fixation portion 59; an extension portion 61; and a vehicle rear-side joint portion 63. The gusset 38 are arranged in a corner portion formed between the vehicle front-side end portion of the front side frame 12 and the connecting plate 36 which meet each other substantially at a right angle.

As shown in FIG. 6, the inclination portion 58 is formed from a side wall which, in its plan view, becomes closer to the front side frame 12 toward the vehicle rear. In other words, the inclination portion 58 is formed from an inclination surface whose part in close proximity of the vehicle front-side end portion 16b of the corresponding lower member 16 is farthest from the front side frame 12, and which becomes closer to the front side frame 12 toward the vehicle rear from this part. Incidentally, the vehicle front-side end portion 16b of the lower member 16 is located on an extension line E of the inclination portion 58 (see FIG. 10).

The fixation portion 59 fixes the gusset 38 to the vehicle front-side end portion of the outer side frame 12b in the vertical direction. As shown in FIG. 9, the fixation portion 59 is formed from vertical overlaps between vehicle width direction inner-side end portions 57c of the respective upper and lower walls 57a, 57b of the gusset 38 and the upper and lower walls 13a, 13b of the width widening portion 13 of the outer side frame 12b. In other words, the fixation portion 59 is formed by joining the vehicle width direction inner-side end portions 57c of the respective upper and lower walls 57a, 57b of the gusset 38 to the upper and lower walls 13a, 13b of the width widening portion 13 of the outer side frame 12b. Incidentally, the fixing of the gusset 38 may be achieved using other fixing means, such as welding or fastening, instead of the fixation portion 59 as long as such other means can fix the gusset 38 in the vertical direction.

Figure 7:
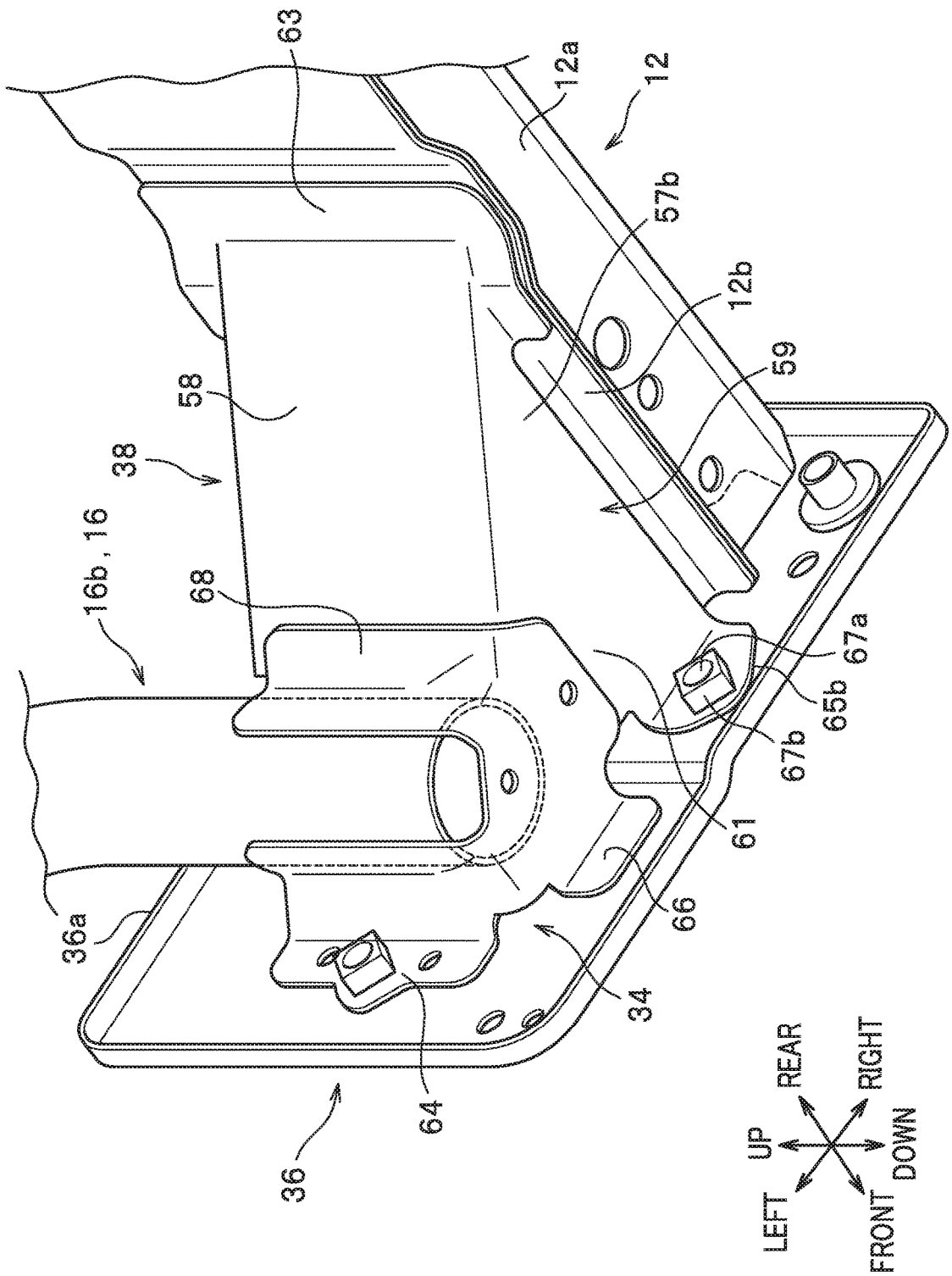
FIG. 7 is a perspective view showing an extension portion of the gusset.

As shown in FIG. 7, the extension portion 61 is formed to extend from the fixation portion 59 toward the connecting plate 36 which is further forward than the fixation portion 59 in the vehicle front direction. A vehicle front-side end portion of the extension portion 61 includes an upper flange 65a bent upward (see FIG. 6), and a lower flange 65b bent downward (see FIG. 7). The gusset 38 is fastened (fixed) to the connecting plate 36 in the vehicle front-rear direction with the assistance of the upper and lower flanges 65a, 65b provided to the extension portion 61, using bolts 67a and nuts 67b.

As shown in FIG. 6 and FIG. 7, the vehicle rear-side joint portion 63 is formed from a U-shaped flange which, in its side view, is shaped like the letter U. This U-shaped flange continues in the vehicle front-rear direction to a rear-side end portion of the inclination portion 58, and is joined to an outer side wall of the outer side frame 12b.

The mounting bracket 34 includes the slit 62 which is formed to extend along an axial direction of the vehicle front-side end portion 16b of lower member 16. Part of the vehicle front-side end portion 16b of lower member 16 is exposed to the outside through the slit 62.

The mounting bracket 34 includes: a fastener flange 64 fastened to the connecting plate 36 using bolts and nuts; a joint flange 66 joined to the connecting plate 36; and a joint flange 68 joined to the inclination portion 58 of the gusset 38. Part of a vehicle width direction inner-side portion of the fastener flange 64, and the joint flange 68 joined to the inclination portion 58 of the gusset 38 extend along the inclination surface of the inclination portion 58.

Returning to FIG. 1, the front bulkhead 18 is arranged in the front end portion of the vehicle. The front bulkhead 18 includes the pair of left and right side stays 56, 56, an upper bulk member 70 and a lower bulk member 72. The pair of left and right side stays 56, 56 are arranged oriented in the vertical up-down direction, in parallel to each other, in the vicinities of the vehicle front-side end portions of the pair of left and right font side frames 12, 12.

The upper bulk member 70 stretches between upper end portions of the pair of left and right side stays 56, 56, and oriented in the vehicle width direction. The upper bulk member 70 has a straight axial cross section which is closed and shaped substantially like a rectangle. The lower bulk member 72 stretches between lower end portions of the pair of left and right side stays 56, 56, and oriented in the vehicle width direction. The lower bulk member 72 is located substantially under the upper bulk member 70 in the vertical up-down direction.

The front bumper mechanism 20 includes the bumper beam 50, and the pair of left and right extensions 48, 48. The bumper beam 50 is located further forward than the vehicle front-side end portion 16b of each lower member 16 and each connecting plate 36, and extends in the vehicle width direction. The pair of left and right extensions 48, 48 are connected to vehicle rear sides of the two vehicle width direction end portions of the bumper beam 50. The extensions 48, 48 are arranged symmetrically in the left-right direction. Each extension 48 includes a front wall, a rear wall, as well as side walls connecting the front wall and the rear wall. The extension 48 is formed substantially in the shape of a box.

As shown in FIG. 1, a pair of left and right damper housings 74, 74 in which to store the respective dampers (not illustrated) are provided above the vehicle rear-side end portions of the front side frames 12, 12. A pair of left and right damper bases 76, 76 configured to support the dampers (not illustrated) are provided above the damper housings 74, 74.

Each damper housing 74 is arranged between the corresponding upper member 14 and the corresponding front side frame 12 in the vehicle width direction. The damper housing 74 is fixed to a lower surface of the corresponding upper inner member 24, the outer side wall of the front side frame 12 (the outer side frame 12b), and a corresponding dashboard upper 77 with the assistance of multiple side flanges.

As shown in FIG. 5, the pair of bulkhead mounting metal brackets 28a, 28b provided to the space portion 26 of the upper member 14 and the pair of bulkhead metal brackets 44a, 44b provided to the space portion 12c of the front side frame 12 are arranged such that the pair of bulkhead mounting metal brackets 28a, 28b are vertically above the pair of bulkhead metal brackets 44a, 44b. A belt-shaped connecting plate 78 is provided in the location where the pair of bulkhead mounting metal brackets 28a, 28b are vertically above the pair of bulkhead metal brackets 44a, 44b, and bends along the shape of the damper housing 74.

The connecting plate 78 connects the upper member 14 and the front side frame 12. The connecting plate 78 is arranged in a vehicle front-side end portion of the damper housing 74, and is formed to extend in the vehicle width direction. In addition, the connecting plate 78 is provided with a reinforcement bead 80 which extends in a longitudinal direction of the connecting plate 78. The reinforcement bead 80 is formed from a straight line-shaped recessed portion which is set back from the rest of the connecting plate 78 in a direction moving away from the damper housing 74. Incidentally, although in the embodiment, the connecting plate 78 and the damper housing 74 are formed as separate entities, they are not limited to be formed in this way. The connecting plate 78 and the damper housing 74 may be integrated into a single unit.

The vehicle body front part 10 according to the embodiment is basically formed as discussed above. Next, descriptions will be provided for how the vehicle body front part 10 works, and what effects can be obtained from the vehicle body front part 10.

In the embodiment, the vehicle front-side end portion of each outer side frame 12b includes the width widening portion 13 which becomes wider outward in the vehicle width direction. In addition, each gusset 38 includes the fixation portion 59 which is vertically fixed to the width widening portion 13 (see FIG. 9). In the embodiment, the fixing portion 59 can be made strong against shear load by the fixing of the gusset 38 to the front side frame 12 vertically. Thereby, the embodiment makes it possible to inhibit the gusset 38 from becoming separate from the front side frame 12 when collision load F (including narrow offset collision load) is inputted from the vehicle front into the vehicle front-side end portion of the front side frame 12 (see FIG. 2).

Furthermore, in the embodiment, since the vehicle front-side end portion of the outer side frame 12b is provided with the width widening portion 13, the outer side frame 12b itself can transmit the collision load to the vehicle rear-side part of the front side frame 12.

Moreover, in the embodiment, the vertical height dimension (H1) of the width widening portion 13 is equal to the vertical height dimension (H2) of the inner side frame 12a (H1=H2). In the embodiment, since the height-direction position of the outer side frame 12b (the width widening direction 13) is made to substantially coincide with that of the inner side frame 12a, it is possible to enlarge the shape of the outer side frame 12b (the width widening portion 13) and the shape of the gusset 38 in response to the inner side frame 12a, as well as it is possible to accordingly increase the amount of load to be transmitted to the vehicle rear-side part of the front side frame 12.

Besides, in the embodiment, the upper and lower flange portions 43a, 43b of each connecting plate 36 are joined to the vehicle front-side end portion of the corresponding front side frame 12, using the sets of upper and lower joining surfaces (B1+B2) which include the upper and lower joining surfaces B1 corresponding to the inner side frame 12a and the upper and lower joining surfaces B2 corresponding to the outer side frame 12b (the width widening portion 13) (see FIG. 9). Thereby, the embodiment makes it possible to inhibit the outer side frame 12b and the inner side frame 12a from becoming separate from each other, and to make the front side frame 12 as a whole efficiently absorb collision load which is inputted into the front side frame 12 from the vehicle front.

In addition, in the embodiment, since a vehicle width direction dimension of the outer side frame 12b is increased using the width widening portion 13, the upper and lower flange portions 43a, 43b of the connecting plate 36 can be easily joined (fixed) to the vehicle front-side end portion of the front side frame 12.

Furthermore, in the embodiment, since the vehicle width direction flange portions 45 (the vehicle width direction inner-side flange portion 45a and the vehicle width direction outer-side flange portion 45b) are provided to the two vehicle width direction sides of the connecting plate 36, collision load can be easily transmitted to the front side frame 12 via the vehicle width direction flange portions 45 on the two vehicle width direction sides thereof when the collision load is inputted from the vehicle front.

Moreover, in the embodiment, the vertical height dimension H3 of the vehicle width direction outer-side flange portion 45b is longer than the vertical height dimension H4 of the vehicle width direction inner-side flange portion 45a (H3>H4). Thereby, the embodiment makes it possible to increase the rigidity and strength against, for example, narrow offset loads Fn which are inputted, as shown in FIG. 2, in diagonal directions from the vehicle front through the bumper beam 50 (collision load from the outside in the vehicle width direction).

Besides, in the embodiment, the extension portion 61 extending from the gusset 38 toward the vehicle front is fastened (fixed) to the connecting plated 36 in the vehicle front-rear direction. Thereby, the embodiment makes it possible for the gusset 38 to receive collision load when the collision load is inputted from the vehicle front. Furthermore, the collision load received by the gusset 38 can be transmitted from the gusset 38 to the front side frame 12.

What is more, the bolts 67a and the nuts 67b which fasten the gusset 38 to the connecting plate 36 with the assistance of the extension portion 61 in the vehicle front-rear direction simultaneously fasten the extension 48 (its vehicle rear-side rear wall), which is attached to the vehicle front-side surface of the connecting plate 36, to the connecting plate 36.

Thereby, the embodiment makes it possible to increase the joining strength among the gusset 38, the connecting plate 36 and the extension 48.

What is claimed is:

1. A vehicle body front part structure, comprising:
    a pair of left and right front side frames extending in a vehicle front-rear direction, and each including an inner member on an inner side and an outer member on an outer side; and
    a gusset member arranged on a vehicle width direction outer side of a vehicle front-side end portion of each front side frame, and including an inclination portion which inclines such that, in its plan view, becomes closer to the front side frame toward a vehicle rear, wherein
    a vehicle front-side end portion of the outer member includes a width widening portion which becomes wider outward in a vehicle width direction, and
    the gusset member includes a fixation portion which is vertically fixed to the width widening portion.

2. The vehicle body front part structure according to claim 1, wherein a vertical height dimension (H1) of the width widening portion is equal to a vertical height dimension (H2) of the inner member (H1=H2).

3. The vehicle body front part structure according to claim 1, wherein
    the vehicle front-side end portion of each front side frame includes a connection member connected to a front bumper mechanism,
    the connection member includes a flange portion extending to an inside of the front side frame, and
    the flange portion is vertically fixed to both the outer member and the inner member.

4. The vehicle body front part structure according to claim 3, wherein
    the flange portion includes a pair of vehicle width direction flange portions arranged on two vehicle width direction sides,
    the pair of vehicle width direction flange portions include a vehicle width direction inner-side flange portion arranged on a side of the inner member, and a vehicle width direction outer-side flange portion arranged on a side of the outer member, and
    a vertical height dimension (H3) of the vehicle width direction outer-side flange portion is longer than a vertical height dimension (H4) of the vehicle width direction inner-side flange portion (H3>H4).

5. The vehicle body front part structure according to claim 3, wherein
    the gusset member includes an extension portion extending from the fixation portion toward the connection member, and
    the extension portion is fixed to the connection member in the vehicle front-rear direction.

* * * * *